May 4, 1965

E. KEZNICKL ET AL 3,181,805

PROJECTOR FOR SUBSTANDARD FILM

Filed March 29, 1963

Inventors:
Eduard Keznickl
Otto Freudenreich
By Ernest G. Montague
Attorney

May 4, 1965  E. KEZNICKL ET AL  3,181,805
PROJECTOR FOR SUBSTANDARD FILM
Filed March 29, 1963  4 Sheets-Sheet 2

May 4, 1965 E. KEZNICKL ET AL 3,181,805
PROJECTOR FOR SUBSTANDARD FILM
Filed March 29, 1963 4 Sheets-Sheet 4

United States Patent Office 3,181,805
Patented May 4, 1965

3,181,805
PROJECTOR FOR SUBSTANDARD FILM
Eduard Keznickl and Otto Freudenschuss, Vienna, Austria, assignors to Karl Vockenhuber and DDr. Raimund Hauser, Vienna, Austria
Filed Mar. 29, 1963, Ser. No. 269,081
Claims priority, application Austria, Apr. 4, 1962, 2,738/62
19 Claims. (Cl. 242—55.11)

The present invention relates to a projector for substandard film having a film threading equipment for the automatic feeding and fastening of the film on the take-up reel, whereby the film is fed to the take-up reel by an arm and is retained by the take-up reel and wound up for instance by teeth engaging the sprocket holes of the film.

Such equipment is already known for a long time. However, the use of the same has disclosed, that the film threading equipment is susceptible to drawbacks to a relatively high extent. Especially damages of the film feeding arm have occurred during the use of the equipment, as well as during the transportation of the same. The last mentioned damages occurred mainly due to incorrect mounting of the take-up reels. In spite of the fact that this equipment brings about an essential simplification of the handling, it has not been accepted in view of the drawbacks mentioned above.

It is, therefore, one object of the present invention, to provide a projector for substandard film, which is sturdy and not susceptible to difficulties and adapted for the feeding of and securing the film to the take-up reel.

It is another object of the present invention to provide a projector for substandard film which includes means preventing the feeding of a film strip to the take-up reel, when another film strip is already wound up on the take-up reel.

With these and other objects in view, which will become apparent in the following detailed description, the present invention will be clearly understood in connection with the accompanying drawings, in which.

Figure 1:
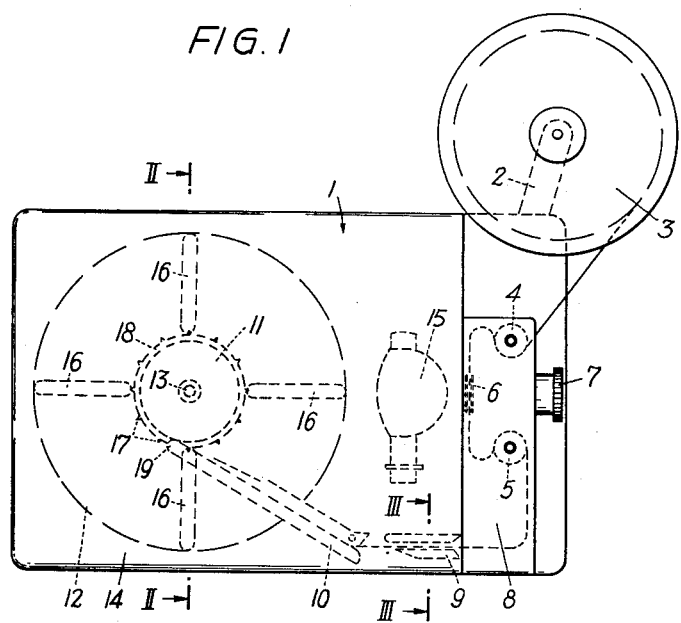
FIGURE 1 is a side elevation of the housing with the projector for substandard film, shown in dotted lines.
Figure 2:
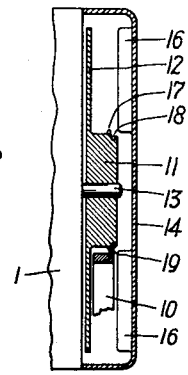
FIG. 2 is a section along the lines II—II of FIG. 1.
Figure 3:
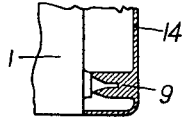
FIG. 3 is a section along the lines III—III of FIG. 1.

Referring now to the drawings, and in particular to FIGS. 1 to 4, an 8 mm. projector using substandard films is disclosed. The projector comprises an oblong housing 1 on which a reel arm 2 for the feed reel 3 is swingably mounted. In the front portion of the device an upper feed sprocket 4, a film gate 6 and a take-up sprocket 5 are provided below the reel 3. An objective 7 is disposed opposite the film gate 6. The feed sprocket 4 and the take-up sprocket 5, the film gate 6 and a channel, through which the film (indicated in broken lines) is guided towards the take-up reel 5, are covered by a common cap 8 (FIG. 1). The film is guided in a channel 9 upon leaving the front portion of the projector and is fed to a film guide channel arranged in a swingable arm 10. The arm 10 rests with its free end on the spool core 11 of the take-up reel and on the film roll, wound up on the spool core, respectively. The take-up reel is surrounded by a lid 14 which is pivoted on the projector housing 1 and which at the same time covers the projection bulb 15. The take-up reel is firmly fastened on a shaft 13 of the projector gear. By this arrangement the mounting which is essentially more exact than it is possible with detachable reels. The film roll is guided along a spool flange 12 of the take-up reel on the one hand and along fins 16 on the other hand. The latter are mounted radially relative to the shaft 13. In order to ensure a good accessibility of the film when the lid 14 is open, the film channel 9 is arranged on the inner side of the lid. Thus, upon opening the lid 14, the film is exposed in this area. As it is clearly shown in FIG. 3, the guide surfaces limiting the channel are skewed, so that upon closing the lid 14 the film glides into the channel 9 and cannot be pinched.

The spool core 11 of the take-up reel carries a range of clasps 17 on its periphery which engage the sprocket holes of the film and thus effect a positive connection. The spool core 11 has an annular recess 18 which is engaged by an extension 19 of the arm 10 when the reel is empty. If a film strip is fed to the reel, it covers the mentioned recess 18 and shifts the extension 19 of the arm 10 out of the annular recess 18. Due to this arrangement, it is achieved that the position of the arm 10, when a film strip is wound up on the reel 12, is clearly different from that, taken on the empty reel. It is thus possible to derive the operation of measuring devices and control arrangements, respectively, from the position of the arm 10.

Figure 4:
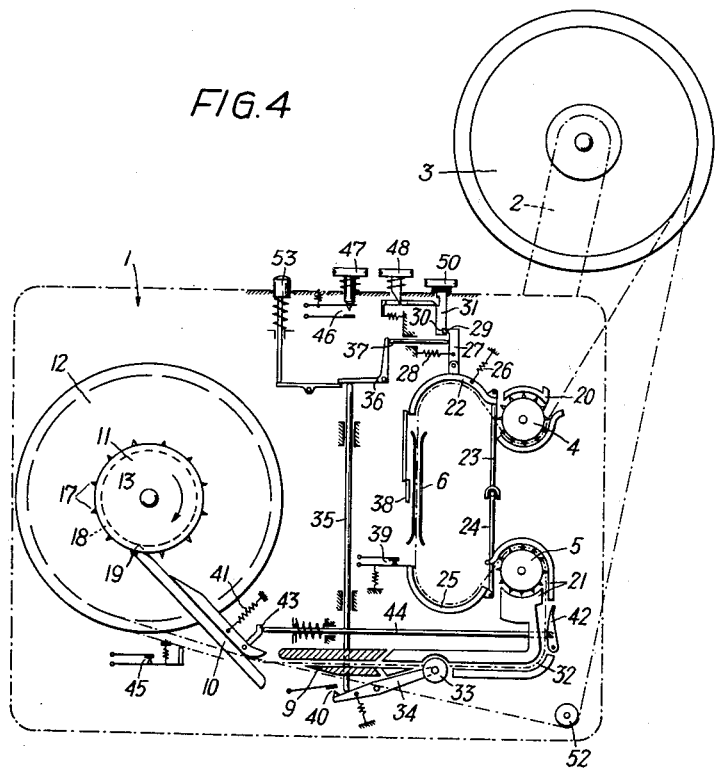
FIG. 4 is an elevation of the projector for substandard film.

FIG. 4 discloses in greater detail the threading equipment with the pertaining sprocket arrangement. The feed sprocket 4 as well as the take-up sprocket 5 are surrounded in a known manner by a stationary film guide 20 and 21, respectively. A swingable loop former 22 follows the upper feed sprocket in the direction of the film run. By means of a fork 23, firmly connected with the loop former 22 the motion of the latter is transmitted to a lever 24. The latter is firmly coupled with a loop former 25, so that both loop formers 22 and 25 are always simultaneously in the operative position, as indicated in full lines, or in the rest position (not shown). A spring 26 holds the loop formers 22 and 25 in their rest position. A lever 27 is pivoted on the loop former 22, which lever 27 is under the action of a spring 28 and which, by means of a tooth-shaped extension engages a recess 30 of a connecting rod 31 connected with an operating key 50. Due to this arrangement, upon pressing the key 50, the arm 27 shifts the loop former 22 into operative position. The key 50 is interlocked in a known manner with an "out"-key 43 by means of a slider 35. Upon pressing the key 50, a switch 49, arranged in the motor circuit (FIG. 5), is closed and at the same time the projection bulb 15 is energized.

Figure 5:
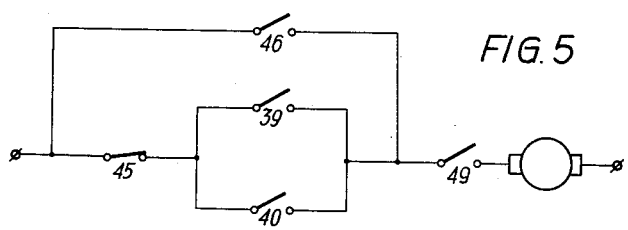
FIG. 5 is a circuit diagram of the circuit incorporated in the projector disclosed in FIG. 4.

The take-up sprocket 5 is arranged behind the loop former 25 in the direction of the film-run, followed by a film guide channel 32, in which a switch point 42 for the film is arranged. The function of this arrangement will be explained below. A scanning roller 33 is disposed in the film channel 32. The scanning roller 33 is mounted on a spring-loaded two-armed lever 34 and, if no film is in the film channel, takes the position as indicated in full lines. If a film strip enters the channel 32, the lever 34 moves in a clockwise direction. Thus the connecting rod 35 is moved upwards, shifting the tooth-shaped extension 29 out of the recess 30 of the connecting rod 31 by means of the pin 37 of the angle lever 36. Thereby the loop formers 22 and 25 are displaced from their resting position under the action of a spring 26. A shutter which covers the film gate 6 during the threading procedure is coupled with the loop former 22. Thereby it is avoided that the spectators are dazzled by incident light which otherwise would fall unweakened on the projector screen. The loop former 25 controls a switch 39 which is arranged in the motor circuit (FIG. 5). If the loop formers 22 and 25 are in the resting position, the switch 39 is open. Parallel to the switch 39, another switch 40 is provided, the operation of which is effected by means of the lever 34.

The film leads from the film channel 32 to the film guide 9 arranged on the lid of the projector housing and from there to the channel which is provided in the arm 10. Under the action of the spring 41 the arm 10 is moved in a clockwise direction and engages the film roll and the spool core, respectively. The film feeding arm 10 is firmly connected with a lever 43 which by mean of a spring-loaded connecting rod adjusts the switch point 42, being in the film channel 32. If there is no film on the spool core 11 of the take-up reel, the switch point 42 is in the position as indicated in full lines. But if a film is wound up on the take-up reel, the arm 10 moves the switch point 42 in a counterclockwise direction, whereby the film strip additionally supplied to the projector is fed out of the film-guide 9.

In order to avoid the supply of a quantity of films which exceeds the equipped capacity of the spool room, a further switch 45 arranged in the motor circuit is provided (FIGS. 4 and 5). If the arm 10 has reached a certain deflection, the switch 45 interrupts the motor circuit. The switch 45, as well as the switches 39 and 40 are effective on advance action of the projector drive only. On reverse action these switches are rendered inoperative by a switch 46 provided in a by-pass circuit and actuated directly by the shift key for advance and reverse action.

The mode of operation of the new arrangement is as follows:

First the film reel 3 is mounted on the reel arm 2 and the projector drive as well as the projection bulb 15 are switched on by pressing the key 50. The key 45 is in the position "advance-action." Therefore, the switch 46 is open. The key 50 is locked in the "switch-on position." As the tooth-shaped extension of the lever 27 pivoted on the loop former 22 is held in mesh with the recess 30 of the connecting rod 31 by the spring 28, the loop former 22 participates in the downward motion of the key 50. For this reason both loop formers 22 and 25 are moved into their operative position. At the same time the film gate 6 is shadowed by the shutter 38 and the switch 39 is closed. As there is no film opposite the scanning roller 33 the switch 40 is open, the end arresting switch 45 is closed and the switch point 42 is in the position as indicated by full lines.

The projector is ready, therefore, for use immediately after pressing the key 50. If a film strip is inserted between the guide 20 of the upper feed sprocket 4, it is immediately received by the latter and, forming a loop, it is fed to the film channel having the film gate 6. Here the film is engaged by a claw (not shown) and, forming a further loop, is fed to the take up sprocket 5 and from the latter to the film channel 32. Then the film arrives at the scanning roller 33 and, pressing the same downwards, moves the lever 34 in a clockwise rotation. The tooth-shaped extension of the lever 27 is thereby lifted out of the recess 30 of the connecting rod 31 by means of the connecting rod 35, the angle lever 36 and the pin 37 and the loop formers 22 and 25 are moved back to their resting position by the spring 26. Due to this arrangement the shutter 38 releases the film gate 6 and the switch 39 is opened. As due to the turning of the lever 34 the switch 40 has been closed, the circuit of the projector motor is not interrupted. Stepped on through the film guide 9 the film arrives at the film guide channel of the arm 10. On the spool core 11 the sprocket holes of the film are engaged by the teeth 17, whereby a positive connection is effected between the spool core 11 and the film. As the film covers the groove 18 of the spool core 11, the extension 19 of the film feeding arm is lifted out of the groove 18, whereby the arm 10 covers a certain relatively large way in a counterclockwise direction. The lever 43 participates in this motion. The connecting rod 44 moves to the left by the force of a spring 44° whereby the tongue of the switch point 42 engages the film edges. The threading procedure is thus completed.

Upon passing the film end first the tongue of the switch point 42 is released and swings in a counterclockwise direction. Then the film end passes the scanning roller 33 which moves to the position as indicated in full lines and thereby opens the switch 40. As the switch 39 is also open, the circuit of the projector motor is interrupted. At the same time the lever 27 is released over the members 35 to 37, which lever 27 thus engages the connecting rod 31 of the key 50 with its tooth-shaped extension.

The length of the film guide 9 is chosen such that, while the film end is in the path of the film guide 9, the projector drive is arrested. As the film guide 9 is arranged on the lid 14 of the projector housing, the film end is well accessible after opening the lid and can be guided over a roller 52 to the reel 3 and fastened on the same. On pressing the key 47 the drive is mechanically shifted to reverse action in a manner which is not shown in the drawing. At the same time the switch 46 is closed. Therefore the motor is reconnected with the main supply and the film is wound back on the reel 3. After having terminated the rewinding procedure the drive can be arrested by pressing the key 48.

In case the film having passed should not be wound back but joined to a further film strip, the film end is guided out and held in the manner as it is explained above. Then, on pressing the key 50 the projector is again put into operation and the new film strip is introduced in the loop former. The procedure passes analogously to that explained above, except that the tongue of the switch point 42 takes its left position. Thus the film is guided outside and can be connected with the end of the first film. After having effected this connection and put back the loop formers 22 and 25 by pressing the key 53, the performance may be continued in the usual manner, whereby however the film is running over the reel 52 and not within the channel 32.

If, caused by composing of several film strips the diameter of the film roll wound up on the take-up reel, has reached an inadmissible size, the arm 10 interrupts the circuit of the motor by operation of the switch 45. In this case, however, a motorical reverse motion of the film is always possible, as the switch 45 is short circuited by the switch 46.

Figure 6:
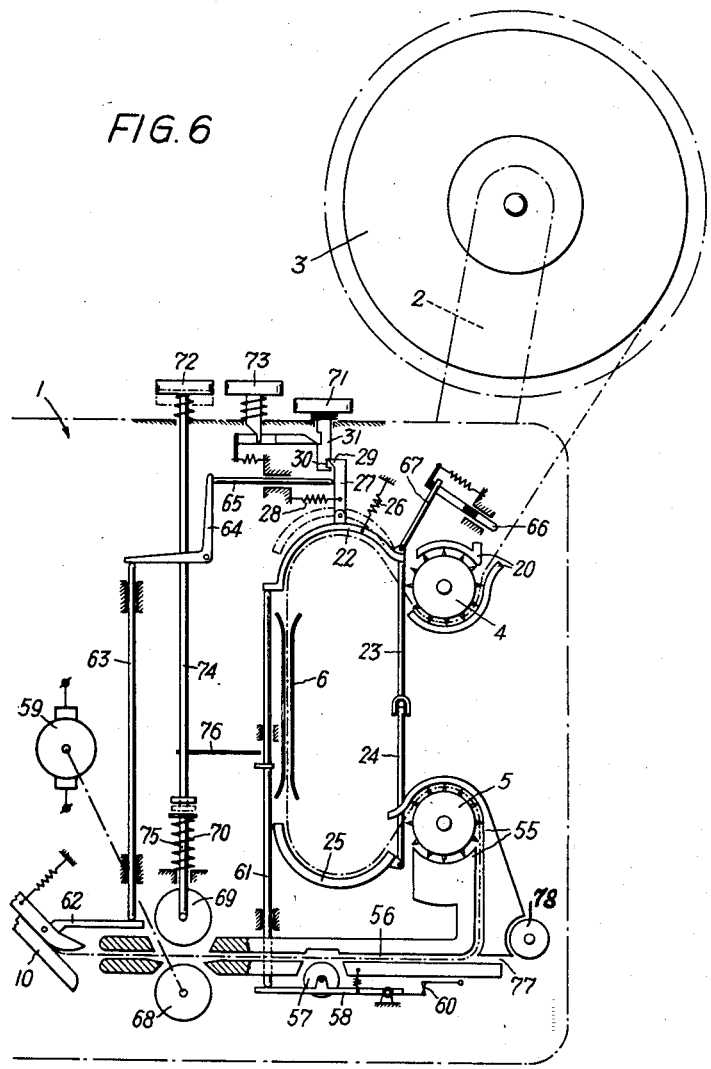
FIG. 6 is an elevation of a second embodiment of the projector designed in accordance with the present invention.

Referring now again to the drawings, and in particular to FIG. 6, another embodiment of the projector is disclosed. The film passes loop formers 22 and 25, which are completely similar to those described with the first embodiment. After having passed the take-up sprocket 5, the film arrives at a film guide 55 which, with a relatively high curvature goes into a linear film guide 56. A roller 57 is provided in the path of this film guide, which roller 57 is mounted on a two-armed lever 58. The lever 58 controls a switch 60 arranged in the circuit of the projector motor 59. The switch 60 is open when no film is opposite the roller 57. If the loop formers 22 and 25 are in the operative position, the lever 58 is moved downwards by the connecting rod 61, so that the switch 60 remains closed. Contrary to the example described above, the displacement of the loop formers 22 and 25 depends upon the position of the arm 10: this latter is connected with a lever 62 which transmits the motion of the arm 10 over a connecting rod 63, an angle-lever 64 and a pin 65 to the lever 27. Due to this arrangement the displacement of the loop formers 22 and 25 from their resting position is effected as soon as a film strip is wound up on the core 11 of the take-up reel. The control of the slider 66 is derived from the position of the loop formed 22 by means of a lever 67. The slider 66 releases the admission channel to the guide surrounding the feed sprockets 4 only when the loop formers 22 and 25 are in their operative position and thus also the take-up reel is empty. A roller 68 is provided spaced from the roller 57, which roller 68 is driven by the projector motor. The roller 68 is arranged at such a distance from the film guide that a firmly stretched film being in the guide cannot engage this roller. A pressing roller 69 is arranged opposite the roller 68, which pressing roller 69 is held in the position as represented by a spring 70.

The control of the projector is effected by means of three keys. A key 71 switches on the projector drive and the projection bulb and at the same time sets the reversing gear (not shown), an advance action. On actuating a key 72 again the circuits of the motor of the bulb are closed, the gear however is adjusted to reverse action. Both keys 71 and 72 are interlocked against each other in a manner (not shown), so that on actuating of one of the keys the other one is displaced into its resting position. A middle key 73 serves the purpose of arresting the projector.

The arrangement is such that upon actuating the key 72 (reverse action), the roller 68 turns in a clockwise direction. If in this switch position the key 72 is depressed to assume the position as indicated in a broken line, the connecting rod 74 gets into engagement with the pin 75 and presses the pressing roller 69 against the revolving roller 68. At the same time the scanning roller 57 swings out of the path of the film guide by means of the arm 76.

This embodiment operates in the following manner: If the projector is put into operation by pressing the key 71, when the take-up reel is empty, the loop formers 22 and 25 move into operative position, whereby the slider 66 is drawn back by the lever 67 and thus the admission channel is open. If a film is introduced it first passes the loop formers 22 and 25 and enters the channel 56. Since the loop formers 22 and 25 are in the operative position, the scanning roller 57 is still lifted at this time. Then the film arrives at the arm 10 where it is wound up on the spool core 11 of the take-up reel. Thereby the arm 10 is moved and causes the displacement of the loop formers 22 and 25 from their resting position, whereby further movement of the lever 58 in a clockwise direction is effected. When the film has passed, the film end arrives in the path of the roller 57 which is released and thus opens the switch 60. The projector drive is thus arrested. The scanning roller 57 is mounted at such a distance from the rollers 68 and 69 that the driving mechanism is arrested before the film end reaches the rollers 68 and 69. If through pressing the key 72 the projector is changed over to reverse action, the connecting rod 74 moves the scanning roller 57 by means of the arm 76 and the connecting rod 61 out of the path of the film guide and at the same time closes the switch 60. The driving motor thus drives the projector driving mechanism by means of the reversing gear (not shown), in a contrary sense of rotation, whereby the roller 68 turns in clockwise direction. If the key 72 is depressed over the stop location as indicated by a broken line, the connecting rod 74 moves the pressing roller 69 downwards by means of the pin 75 and thus effects a friction connection between the film strip and the rotating roller 68. The film is shifted to the right and leaves the guide 56 at 77, and can now be guided by hand over the roller 78 to the reel 3 and fastened on the same.

If by mistake it would be tried to introduce a film in the projector when a film strip is still wound up on the spool core 11, the slider 66 which closes the admission channel to the film guide 20 would prevent this.

Figure 7:
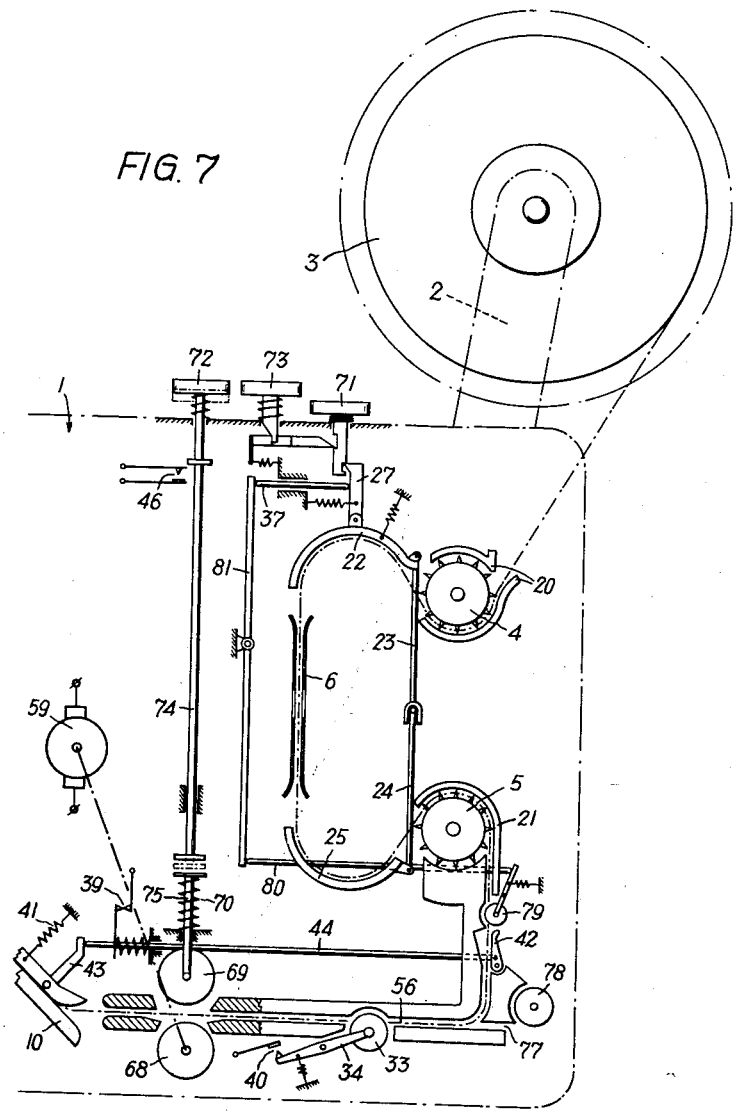
FIG. 7 is an elevation of a third embodiment of the projector designed in accordance with the present invention.

Referring now again to the drawings, and in particular to FIG. 7, a further embodiment of the projector is disclosed. Deviating from the embodiment shown in FIG. 4, a scanning roller 79, effecting the displacement of the loop former 25 in the resting position by means of the connecting rod 80 and the lever 81, is arranged between the take-up sprocket 5 and the switch point 42. The latter is controlled by the film feeding arm 10 as mentioned above. The actuation of the switch 39 is also derived from the arm 10. The control of the switch 40 is effected by means of the roller 33 arranged in the horizontal portion of the film guide. Spaced from the roller 33 a driving roller 68 and a pressing roller 69 are provided, which are driven and controlled, respectively, analogously to the arrangement as shown in FIG. 6.

If according to this arrangement a film strip is inserted after having started the projector, this film strip runs through the loop formers 22 and 25, arrives at the take-up sprocket, passes the roller 79 and causes the loop formers 22 and 25 to be displaced from their resting position. When the take-up reel is empty, the switch point 42 guides the film through the film channel to the arm 10 which leads the film to the take-up reel 12 and winds it up on the core 11. This causes the arm 10 to be deviated and to dislocate the switch point 42 and interrupt the switch 39 at the same time.

As soon as the film end arrives at the roller 33, the switch 40 is opened which thus arrests the projector driving mechanism. On pressing the key 72 the driving mechanism is turned to reverse action and the film is shifted through the roller 68 to the right and out of the film guide. The film can now be fastened on the reel 3 or may be connected to a second film strip which has been introduced in the loop formers in the same manner and which is guided outside by the switch point 42. On threading the second film strip the loop formers are also automatically replaced in the rest position by means of the roller 79. After having connected the two film strips the film runs outside of the film guide over the idler wheel. On the pass of the end of the second film strip the switch 40 is opened and thus the projector is automatically arrested.

Since the last mentioned embodiment the control procedure is automatically effected also upon introducing several separated film strips, this device is suited for the film working to an especially high extent.

It will be understood that the invention is not restricted to the illustrated examples and that rather numerous variations may be made without leaving the scope of the invention.

Different elements of construction may be replaced by equivalent parts. So for instance scanners lying laterally against the film edges may be used instead of scanning rollers. Means may also be provided which indicate in an optical manner if the take-up spool is empty.

The film feeding arm 10 may also carry a contact which faces a conducting surface of the spool core and which closes the circuit of an electromagnet when no film is wound up on the spool core, whereby the mentioned electromagnet causes the release of the film admission channel.

Means may also be provided which lift the film feeding arm from the take-up spool, when the lid of the projector housing is open.

While I have disclosed several embodiments of the present invention, it is to be understood that these embodiments are given by example only and not in a limiting sense, the scope of the present invention being determined by the objects and the claims.

What we claim is:

1. In a motion picture projector for substandard film, a housing, a driving mechanism comprising a motor provided within said housing and adapted to drive a film strip, a self-threading device having an inlet for a film strip and an exit, further comprising loop forming means movable in an operative position for forming loops in a film strip and in an inoperative position, and film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite the exit of the said film guiding means, said arm being adapted to guide a film strip to said hub, a lid provided on said housing of the projector adapted to cover and protect both the take-up reel and the film guiding arm, and further comprising sensing means determining if there is a film strip wound up on the hub of the take-up reel.

2. The motion picture projector, as set forth in claim 1, which includes a control device for said loop forming means, controlled by said sensing means and adapted to move said loop forming means into its inoperative position, if there is a film strip wound up on said hub of said take-up reel.

3. The motion picture projector, as set forth in claim 1, which includes means for shutting said inlet of said self-threading device, said shutting means being controlled by said sensing means and adapted to shut said inlet of said self-threading device, if there is a film strip wound up on said hub of said take-up reel.

4. The motion picture projector, as set forth in claim 1, which includes a switch point disposed in said film guiding means, and said self-threading device has a second exit, said switch point includes a tongue movable in two positions, in the first of said positions the film being guided to said take-up reel, in the second of said positions said film is guided to said second exit, said tongue being controlled by said sensing means such that, when there is a film wound up on said hub of said take-up reel an inserted film strip is guided to said second exit, and if there is no film on the hub an inserted film strip is guided to said take-up reel.

5. In a motion picture projector for substandard film, a housing, a driving mechanism comprising a motor, provided within said housing and adapted to drive a film strip, a self-threading device having an inlet for a film strip and an exit, further comprising loop forming means movable in an operative position for forming loops in a film strip and in an inoperative position, and film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite the exit of the said film guiding means, said arm being adapted to guide a film strip to said hub, a lid provided on said housing of the projector adapted to cover and protect both said take-up reel and said film guiding arm, said hub of said take-up reel having a circumferential groove, said groove being covered by a film strip wound up on said hub, an extension of said film feeding arm, being arranged opposite said groove, engaging the latter when there is no film wound up on said take-up reel, a film strip wound up on said hub urging said extension to leave said groove, thereby causing a large initial path of said film feeding arm, and a control device for said loop forming means being controlled by said film feeding arm moving the loop forming means in its inoperative position, when the extension of said film feeding arm is held out of said groove.

6. In a motion picture projector for substandard film, a housing, a driving mechanism comprising a motor, provided within said housing and adapted to drive a film strip, a self-threading device having an inlet for a film strip and an exit, further comprising loop forming means movable in an operative position for forming loops in a film strip and in an inoperative position, and film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite the exit of the said film guiding means, said arm being adapted to guide a film strip to said hub, a lid provided on said housing of the projector adapted to cover and protect both said take-up reel and said film guiding arm, said hub of said take-up reel having a circumferential groove and covered by a film strip wound up on said hub, and extension of said film feeding arm being arranged opposite said groove engaging the latter when there is no film wound up on said take-up reel, a film strip, wound up on said hub, urging said extension to leave said groove, thereby causing a large initial path of said film feeding arm, and means shutting said inlet of said self-threading device, said means being controlled by said film feeding arm, and shutting the inlet of said self-threading device, when said extension of said film feeding arm is held out of said groove.

7. In a motion picture projector for substandard film, a housing, a driving mechanism comprising a motor provided within said housing and adapted to drive a film strip, a self-threading device having an inlet for a film strip and an exit, further comprising loop forming means movable in an operative position for forming loops in a film strip and in an inoperative position, and film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite the exit of the said film guiding means, said arm being adapted to guide a film strip to said hub, a lid provided on said housing of the projector and adapted to cover and protect both said take-up reel and said film guiding arm, said hub of said take-up reel having a circumferential groove covered by a film strip wound up on said hub, an extension of said film feeding arm being arranged opposite said groove engaging the latter, when there is no film wound up on said take-up reel, a film strip, wound up on said hub, urging said extension to leave said groove, thereby causing a large initial path of said film feeding arm, a switch point in said film guiding means and a second exit of said self-threading device, said switch point including a tongue movable in two positions, in the first of said positions the film being guided to said take-up reel, in the second of said positions the film being guided to said second exit, said tongue being controlled by said film feeding arm guiding a film strip introduced in said self-threading device to said take-up reel, when the extension of said film feeding arm engages said groove and guides said film strip to said second exit when said extension of said film feeding arm is held out of said groove.

8. In a motion picture projection for substandard film, a housing, a driving mechanism comprising a motor provided within said housing and adapted to drive a film strip, a self-threading device having an inlet for said film strip and an exit, further comprising loop forming means movable in an operative position for forming loops in said film strip and in an inoperative position, and film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite said exit of said film guiding means, said arm being adapted to guide said film strip to said hub, a lid provided on said housing of said projector adapted to cover and protect both said take-up reel and said film guiding arm, an advance action-circuit of the driving motor including a switch and being controlled by said film feeding arm to interrupt said circuit of said motor on advance action, when the film roll has reached a maximum diameter and said film feeding arm lying on said film roll has reached a maximum deflection.

9. In a motion picture projector for substandard film, a housing, a driving mechanism comprising a motor, provided within said housing and adapted to drive a film strip, a self-threading device having an inlet for a film strip and an exit, further comprising loop forming means movable in an operative position for forming loops in a film strip and in an inoperative position, film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite said exit of said film guiding means, said arm being adapted to guide a film strip to said hub, a lid provided on said housing of said projector and adapted to cover and protect both said take-up reel and said film guiding arm, a scanner provided in said film guiding means lying in the path of the film, an advance action circuit of the motor including a switch being controlled by said scanner and interrupting said circuit on advance action, when no film is opposite said scanner, and further comprising means being operative during threading of said film strip thereby making said switch ineffective.

10. The motion picture projector, as set forth in claim 9 wherein said means making said switch in said circuit ineffective during the threading of said film strip comprises a connecting rod controlled by said loop forming means and closing said switch, when said loop forming means are in their threading position.

11. The motion picture projector, as set forth in claim 9, wherein said means making said switch in said circuit ineffective during the threading of said film strip comprises a by-pass circuit for said switch, a second switch in said by-pass circuit controlled by said loop forming means such that the second switch is closed when said loop forming means are in their threading position, and is open, when said loop forming means are in their inoperative position.

12. In a motion picture projector for substandard film, a housing, a driving mechanism, comprising a motor, provided within said housing and adapted to drive a film strip, a self-threading device having an inlet for a film strip and an exit, further comprising loop forming means movable in an operative position for forming loops in a film strip and in an inoperative position, spring means tending to hold said loop forming means in its inoperative position, locking means holding said loop forming means in its operative position, further comprising film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite the exit of said film guiding means, said arm being adapted to guide a film strip to said hub, a lid provided on said housing of said projector adapted to cover and protect both said take-up reel and said film guiding arm, a scanner provided in said film guiding means lying in the path of said film, an advance action circuit of said motor including a switch and being controlled by said scanner and interrupting said circuit on advance action when no film is opposite said scanner, further comprising means being operative during the threading of a film strip, thereby making said switch ineffective, and a second scanner provided in the path of said film connected with said locking means for said loop forming means, and adapted to unlock the latter when it is lying against the film, said second scanner being arranged with respect to the film advance direction behind said scanner controlling said switch in said circuit.

13. In a motion picture projector for substandard film, a housing, a driving mechanism, comprising a motor, provided within said housing and adapted to drive a film strip, a self-threading device having an inlet for said film strip and an exit, further comprising loop forming means movable in an operative position for forming loops in said film strip and in an inoperative position, spring means tending to hold said loop forming means in its inoperative position, locking means holding said loop forming means in its operative position, further comprising film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite the exit of said film guiding means, said arm being adapted to guide a film strip to said hub, a lid provided on said housing of said projector adapted to cover and protect both said take-up reel and said film guiding arm, a scanner provided in said film guiding means lying in the path of said film, an advance action circuit of said motor including a switch and being controlled by said scanner and interrupting said circuit on advance action, when no film is opposite said scanner, further comprising means being operative during the threading of a film strip, thereby making said switch ineffective, and said scanner being connected with said locking means for said loop forming means and adapted to unlock the latter, when it is lying against said film.

14. In a motion picture projector for substandard film, a housing, a driving mechanism, comprising a motor, provided within said housing and adapted to drive a film strip, a self-threading device having an inlet for said film strip and an exit, further comprising loop forming means movable in an operative position for forming loops in said film strip and in an inoperative position, spring means tending to hold said loop forming means in its inoperative position, locking means holding said loop forming means in its operative position further comprising film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite said exit of said film guiding means, said arm being adapted to guide said film strip to said hub, a lid provided on said housing of said projector adapted to cover and protect both said take-up reel and said film guiding arm, said hub of said take-up reel having a circumferential groove, said groove being covered by said film strip wound up on said hub, an extension of said film feeding arm being arranged opposite said groove engaging the latter, when there is no film wound up on said take-up reel, a film strip, wound up on said hub, urging said extension to leave said groove, thereby causing a large initial path of said film feeding arm, said film feeding arm being coupled with said locking means for said loop forming means and adapted to unlock the latter, when the extension of said film feeding arm is held out of said groove of said take-up reel hub.

15. The motion picture projector, as set forth in claim 9, wherein a part of said film guiding means arranged behind said scanner with respect to the film advance direction is mounted on said lid of said housing of said projector, so that said film is exposed when said lid is open.

16. In a motion picture projector for substandard film, a housing, a driving mechanism comprising a motor, provided within said housing and adapted to drive a film strip, a self-threading device having an inlet for said film strip and an exit, further comprising loop forming means movable in an operative position for forming loops in said film strip and in an inoperative position, and film guiding means arranged behind said loop forming means with respect to the advance direction of the film movement, an axle rotatably mounted on said housing and driven by said driving mechanism, a take-up reel comprising a hub being fixed on said axle, film latching means on said hub, a film feeding arm pivoted close to said take-up reel and opposite said exit of the said film guiding means, said arm being adapted to guide said film strip to said hub, a lid provided on said housing of the projector adapted to cover and protect both said take-up reel and said film guiding arm, a scanner provided in said film guiding means lying in the path of said film, an advance action circuit of said motor including a switch and being controlled by said scanner and interrupting said circuit on advance action when no film is opposite said scanner, further comprising means being operative during the threading of said film strip, thereby making said switch ineffective, a driving roller driven by said motor and arranged in the film guiding means with respect to the film advance direction behind said scanner, and control means having an inoperative and an operative position causing in the operative position an engagement of said driving roller and said film strip, said film guiding means defining a second exit and being constructed to guide said film strip, when moving in reverse direction through said second exit out of said projector housing.

17. The motion picture projector, as set forth in claim 16, which includes operation control means for said driving mechanism defining in respective positions an advance and a reverse action of said driving mechanism, said control means for said driving roller being interlocked against said operation control means such that said driving roller may be brought into engagement with said film strip only when the operation control means is in its reverse position, and said driving roller rotates in a sense to move said film strip in reverse direction.

18. The motion picture projector, as set forth in claim 16, wherein said film guiding means comprise a channel bifurcated against the normal direction of film feed, a considerably curved branch of said channel in reverse direction of film movement leading to said loop forming means, and a slightly curved branch of said channel in reverse direction of film movement leading to said second exit.

19. The motion picture projector, as set forth in claim 16, which includes operation control means for said driving mechanism defining in different positions an advance and a reverse action of said driving mechanism, and said control means for said driving roller being controlled by said operation control means to bring said driving roller into engagement with said film strip, when the operation control means are in the reverse position, and are brought into a position passing a stop location of said reverse position, respectively.

References Cited by the Examiner

UNITED STATES PATENTS

| | | | |
|---|---|---|---|
| 2,503,453 | 4/50 | Pratt et al. | 242—76 X |
| 2,843,688 | 6/58 | Masem | 242—57 X |
| 2,891,736 | 6/59 | Blaes | 242—55.12 |
| 2,922,642 | 1/60 | Cousino | 242—55.13 X |

MERVIN STEIN, *Primary Examiner.*